United States Patent [19]
Driscoll et al.

[11] Patent Number: 5,180,270
[45] Date of Patent: Jan. 19, 1993

[54] WATER FLOW PATCH

[76] Inventors: Daniel F. Driscoll, 238 Sunnyhill La., Oconomowoc, Wis. 53066; Dennis B. Cooper, 820 Back Bay Rd., Delafield, Wis. 53018

[21] Appl. No.: 716,226

[22] Filed: Jun. 17, 1991

[51] Int. Cl.$^5$ .................. F16B 33/00; F16B 43/02; E21D 11/00
[52] U.S. Cl. .................. 411/369; 411/542; 405/150.1; 405/151; 52/410
[58] Field of Search .............. 411/369, 370, 542, 915; 405/150.1, 151; 138/98, 99; 52/410, 512

[56] References Cited

U.S. PATENT DOCUMENTS

| | | | |
|---|---|---|---|
| 2,529,411 | 11/1950 | Northrup | 138/99 |
| 3,141,478 | 7/1964 | Copeland | 138/99 X |
| 3,480,043 | 11/1969 | Proudfoot et al. | 138/99 |

FOREIGN PATENT DOCUMENTS

| | | | |
|---|---|---|---|
| 8105373 | 6/1983 | Netherlands | 52/410 |

*Primary Examiner*—Neill R. Wilson
*Attorney, Agent, or Firm*—Willis B. Swartwout, III

[57] ABSTRACT

A seal for leaking fissures or faults of a tunnel which has a first, deformable layer with two surfaces, one of which is scalloped in vertical cross-sectional dimension and the other of which abuts a second flexible layer of more dense material such as neoprene. The surface of the second layer remote from the first layer is overlain about its periphery by strapping preferably made from steel. The seals are generally rectangular in horizontal plan and if the seal is sufficiently elongated intermediate strappings are provided between the width end straps as required. A plurality of registering apertures are provided in the first and second layers and the strapping material to receive therethrough elongated self-threading concrete screws for securing the seal into pilot holes in the tunnel surface around a leaking fissure or fault.

3 Claims, 3 Drawing Sheets

WATER FLOW PATCH

BACKGROUND OF THE INVENTION

The present invention relates to pipe patches or plugs and most specifically to a hydro seal, pipe patches or plugs for so called "deep tunnel" projects.

In a number of major cities in the United States the storm sewer system has proven inadequate in rain storms where a great deal of rain falls in a short period of time. In such a situation the ordinary municipal sewer system overflows and raw sewage can flow into the lakes or rivers where ordinarily only pure water is discharged after sewage treatment.

Certain cities have been required by court order to correct such a situation where it also affects the water supply for other communities downstream or on the same body of water.

One solution that is being tried in a number of major U.S. cities is to excavate one or more "deep tunnels" under the city to act as holding tanks or vats for such overflow when there is a need and then the contents can be lift pumped to the water treatment facility after the emergency situation is over.

When such a "deep tunnel" is excavated it usually is deep enough to be located in the underlying rock formations. In many areas the rock is sedimentary, but even igneous or metamorphic rock will have faults and fissures. When such is the case, and that is usual, there is the strong possibility that water may flow into the tunnel excavation in substantial quantities. This water is sometimes from a long way away flowing underground through the rock formations and sometimes is the water from the local water table. Aside from this problem being undesirable in the construction of the tunnel, there is also the problem that the outflow of water from the local water table can create "sink holes" or cause pilings supporting major buildings to start serious rotting or deterioration once the water is removed endangering buildings above the general area of the "sink holes" or the drained water table.

In the past the attempt was made to introduce a caulk into the fissures to plug the incoming water and cause it to flow undisturbed as it had in the past before the excavation. This did eventually solidify and plug the fault or fissure if the water flow could be temporarily stopped but it took a great deal of time to stop the flow with rags and other materials and for the caulk to

SUMMARY OF THE INVENTION

It is an object of the present invention to overcome the problems of the prior art as above set forth by providing a hydro seal, patch or plug for the fault or fissure including a strata of deformable material bonded to one surface of a strata backing material still having some torsional or bendable flexing capability, and means for securing the patch over the fault or fissure in such a fashion as to compress the deformable material against the surface to be sealed so that the flow of incoming water is stopped, allowing caulk to be introduced into the fault or fissure upstream from the fault or fissure opening.

It is another object to provide structure of the character above described wherein the deformable material is a foam rubber or a composition compound.

It is a further object of the present invention to provide structure of the character above described wherein the backing material is neoprene, plastic or fiberglass.

It is yet another object of the present invention to provide in a device of the character above described a surface of the foam rubber remote from the backing material which is scalloped to provide alternate ridges and valleys.

It is still another object of the present invention to provide a device of the character above described wherein the means for securing the structure in place are steel straps and elongated concrete type screws inserted through apertures in the deformable material and backing material and into pre-drilled apertures in the stone surface adapted to receive the screws.

The foregoing and other objects and advantages of the invention will apear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
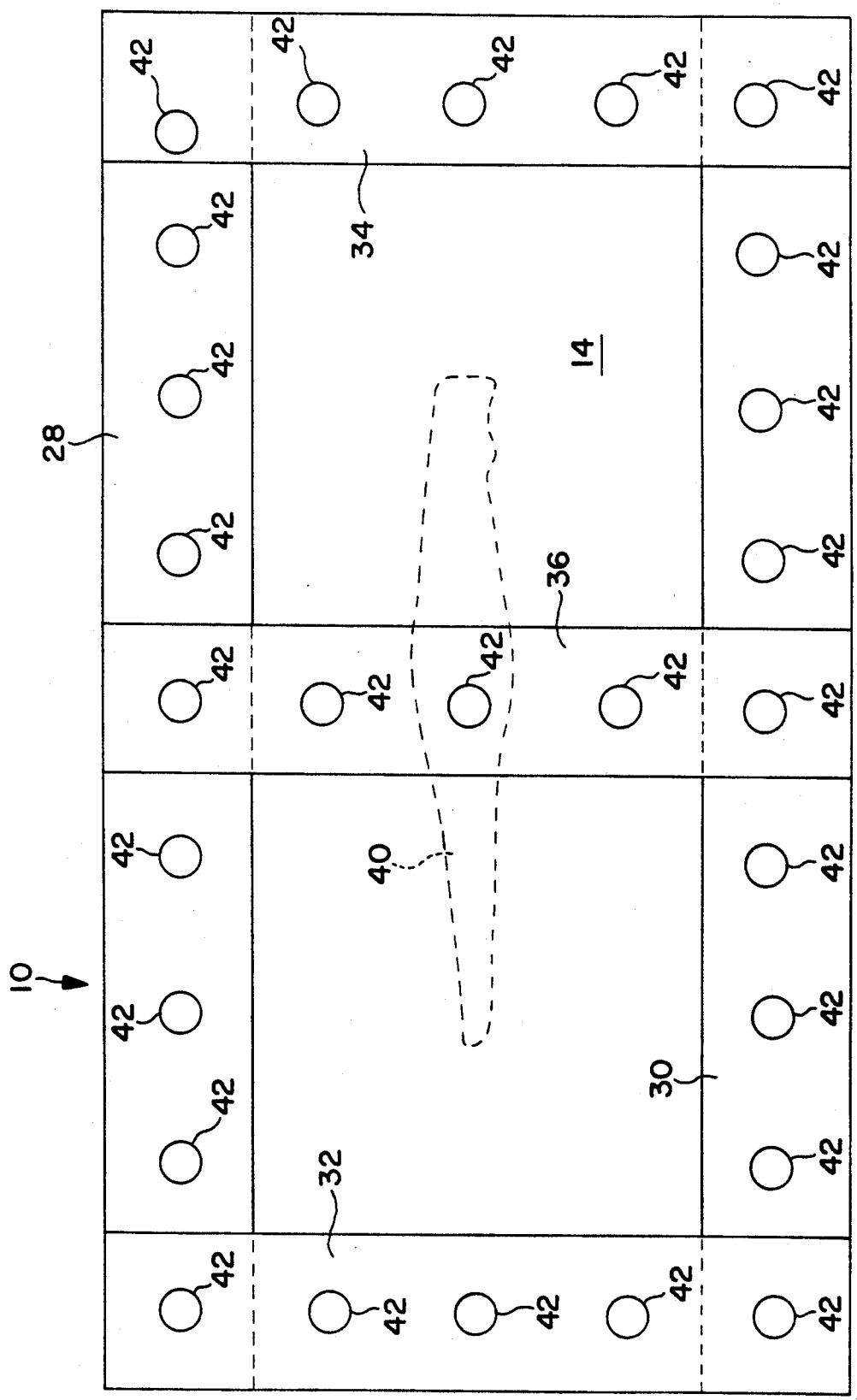
FIG. 1 is a top plan view of structure embodying the present invention.
Figure 2:
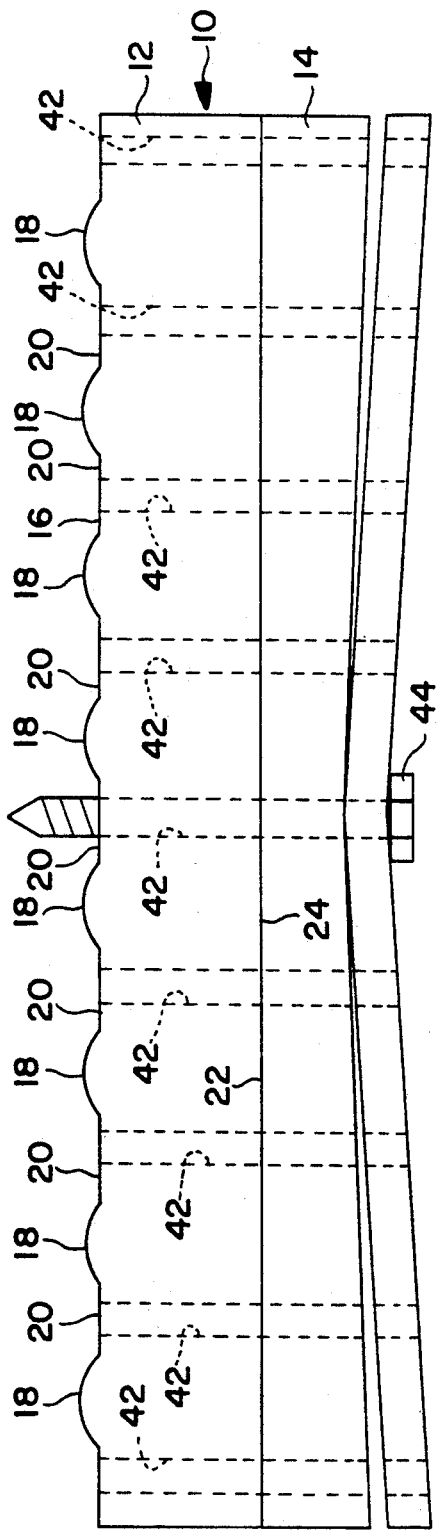
FIG. 2 is a side elevational view of the structure shown in FIG. 1.

Referring now to the drawings and particularly to FIGS. 1 and 2 thereof, a hydro seal, patch or plug according to the present invention is shown and identified generally by the numeral 10. Seal 10 consists generally of two layers, a foam rubber deformable layer 12 and a neoprene hard rubber or composition, plastic or fiberglass layer 14. Referring in particular to FIG. 2 of the drawings, it can be seen that deformable foam layer 12 has one surface 16 that is scalloped into alternate ridges 18 and valleys 20. The opposite surface 22 of foam layer 12 is generally flat and adapted to be joined to one surface 24 of layer 14. Layers 12 and 14 may be joined by any suitable adhesive (not shown) but it should be noted that layer 14 is a relatively more rigid surface than layer 12 such that layer 12 will conform generally to the vertical cross-sectional dimension of layer 14. In that regard layer 14 is arcuate in vertical cross-section or plan and generally concave so as to be complementary to the interior surface of a generally cylindrical tunnel generally identified by the numberal 26 in FIG. 3.

Seal 10 is further provided with marginal or peripheral straps including elongated first straps 28 and 30 which are spaced, generally parallel, and generally concave in vertical cross-section adjacent width margins of seal 10 and a pair of elongated second straps 32 and 34 which are spaced and generally parallel adjacent the length margins of seal 10. Depending on the length of seal 10, one or more interim straps 36 may span the width of seal 10 intermediate straps 32 and 34 and spaced and generally parallel to straps 32 and 34.

Figure 4:
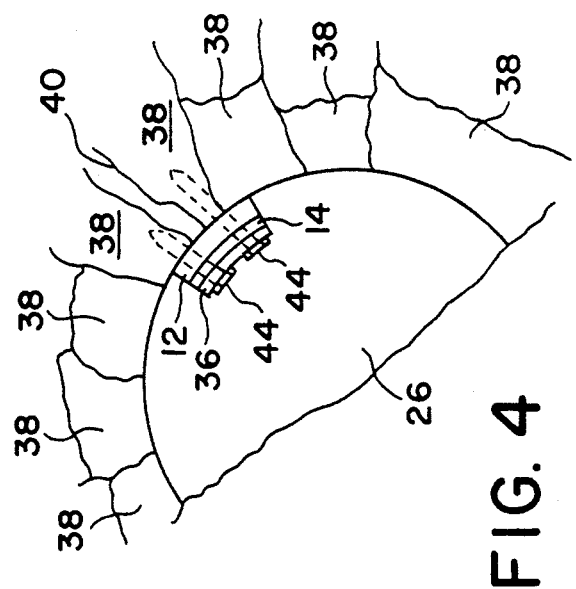
FIG. 4 is a view similar to FIG. 3 showing a seal according to the present invention in place over the fault or fissure.
Figure 3:
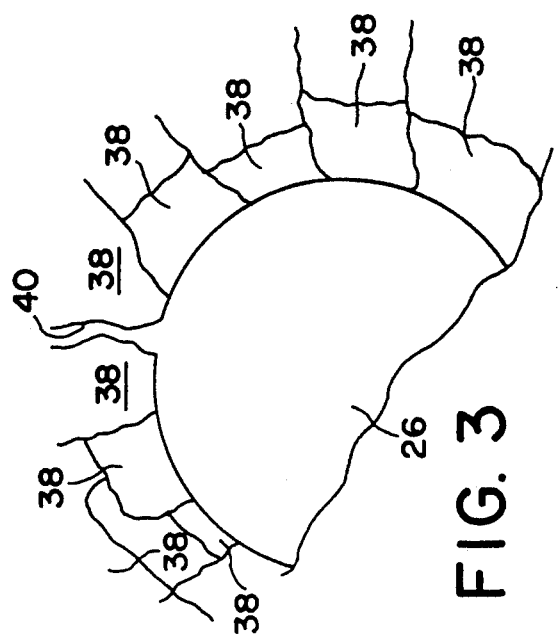
FIG. 3 is a vertical cross-section through a tunnel segment showing a fissure or fault.
Figure 5:
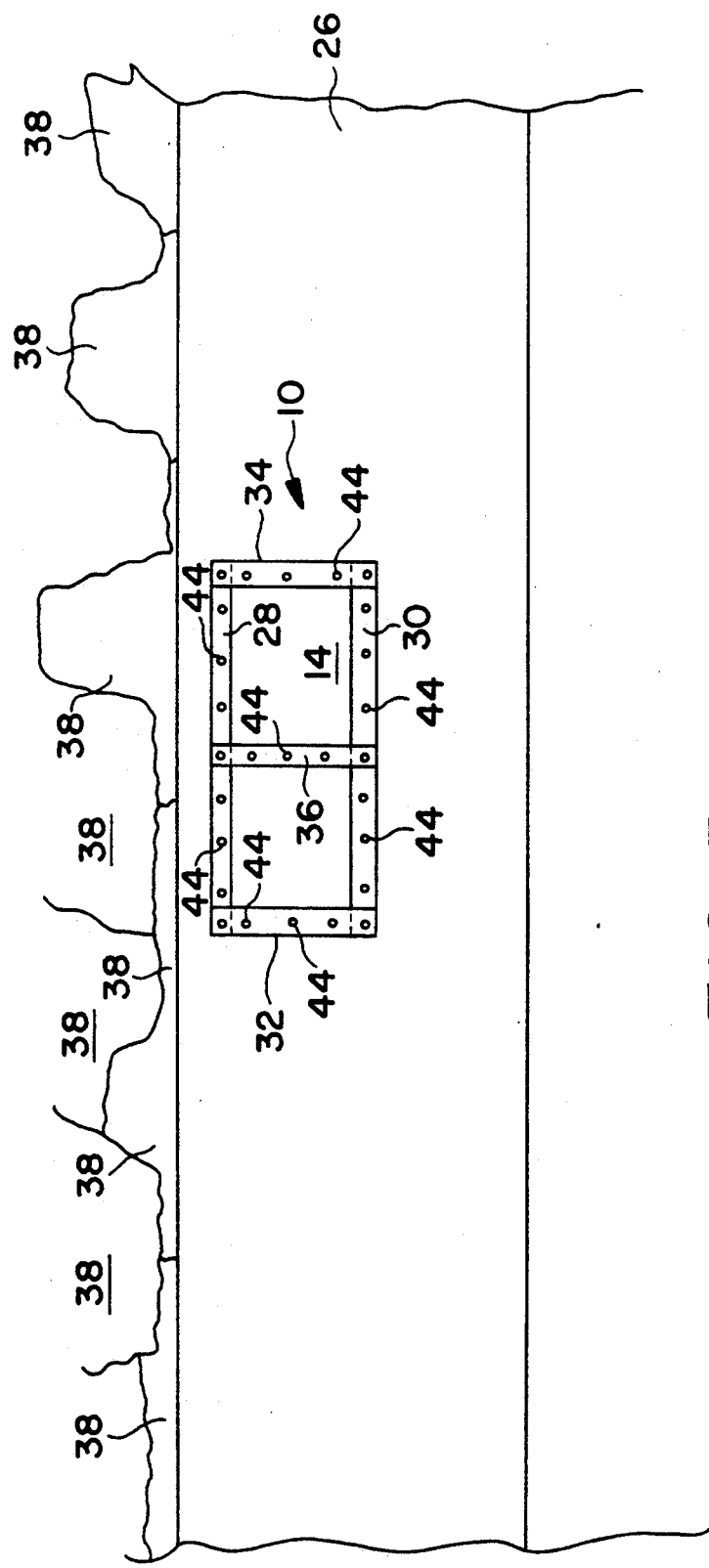
FIG. 5 is a transverse vertical cross-sectional view through the structure shown in FIGS. 3 and 4 with a seal according to the present invention in place.

Referring now specifically to FIGS. 3 through 5, a tunnel segment is shown and generally identified by the numeral 26. In vertical cross-section through the tunnel segment, it can be seen that the tunnel 26 is through rock 38. The rock 38 may be either sedimentary, igneous or metamorphic rock but not that there are many faults and fissures therein. Specifically fault 40 is shown through which water pours into tunnel 26. A seal 10 of the appropriate length and width is formed to close off the leak in through fault 40. A series of pilot holes are drilled into the tunnel segment 26 to match up with apertures 42 extending through the straps 28, 30, 32, 34 and 36, the deformable layer 12 and backing material layer 14. A plurality of self-threading screws 42 adapted to threadably engage with stone are used to hold the seal 10 in place over the fault 40. As the screws are tightened down they compress layer 14 against layer 12 which then deforms against the tunnel surface and ridges 18 and valleys 20 distort to perfectly seal against the leakage of water. An opening is subsequently drilled into the fault 40 upstream of seal 10 and at an angle to the fault stream line into which caulk is pumped and the seal 10 prevents the caulk from running out, holding it in place until it hardens, sealing off the water permanently from the tunnel.

We claim:
1. A seal comprising:
 a) a first seal deformable layer being formed from a foam material and having a first surface scalloped in vertical cross-sectional dimension forming alternate ridges and valleys and a second smooth surface remote from and facing oppositely to said first surface;
 b) a second seal flexible layer composed of a more dense and firm material than said first layer, said second layer having a first surface abutting said second surface of said first layer and a second surface facing oppositely to said first surface;
 c) strapping means overlying the second surface of said second layer made from steel and disposed peripherally of said seal second layer;
 d) registering apertures in said first and second seal layers and said strapping means; and
 e) fastening means adapted to fit through said apertures to fasten said seal to pilot holes in a surface.
2. The structure as set forth in claim 1, wherein said layers are generally rectangular in horizontal plane and wherein intervening straps are provided intermediate the peripheral straps across the width of said seal.
3. The structure as set forth in claim 1, wherein said fastening means are self-threading concrete screws elongated to substantially exceed in length the combined thickness of said first and second layers and said strapping means.

* * * * *